(12) United States Patent
Hatanaka et al.

(10) Patent No.: US 8,857,195 B2
(45) Date of Patent: Oct. 14, 2014

(54) ABSORBENT FOR SPRAY CAN, PROCESS FOR PRODUCING ABSORBENT SHEET FOR SPRAY CAN, AND SPRAY CAN PRODUCT

(75) Inventors: Toshifumi Hatanaka, Himeji (JP); Masaki Okada, Fuji (JP); Kiyotaka Miyata, Fuji (JP); Teruo Miura, Fuji (JP)

(73) Assignees: NKK Co., Ltd., Himeji-shi (JP); Toyota Tsusho Corporation, Nagoya (JP)

( * ) Notice: Subject to any disclaimer, the term of this patent is extended or adjusted under 35 U.S.C. 154(b) by 1119 days.

(21) Appl. No.: 12/448,560

(22) PCT Filed: Dec. 25, 2007

(86) PCT No.: PCT/JP2007/074836
§ 371 (c)(1),
(2), (4) Date: Aug. 6, 2009

(87) PCT Pub. No.: WO2008/078743
PCT Pub. Date: Jul. 3, 2008

(65) Prior Publication Data
US 2010/0037628 A1 Feb. 18, 2010

(30) Foreign Application Priority Data

Dec. 26, 2006 (JP) ................................. 2006-348736

(51) Int. Cl.
*B67D 7/00* (2010.01)
*F17C 11/00* (2006.01)
*B65D 83/36* (2006.01)
*D04H 1/42* (2012.01)
*C09K 3/30* (2006.01)
*D04H 1/04* (2012.01)

(52) U.S. Cl.
CPC ............... *F17C 11/00* (2013.01); *B65D 83/36* (2013.01); *F17C 11/007* (2013.01); *D04H 1/42* (2013.01); *C09K 3/30* (2013.01); *D04H 1/04* (2013.01)

USPC ..................................... 62/46.1; 222/3; 222/5

(58) Field of Classification Search
USPC ............ 62/46.3, 45.1, 46.1; 15/405; 206/204; 222/3, 5; 239/44, 53; 141/3, 20
See application file for complete search history.

(56) References Cited

U.S. PATENT DOCUMENTS 4,729,494 A * 3/1988 Peillon et al. ...................... 222/3
5,544,785 A * 8/1996 Frigiere ............................. 222/3

FOREIGN PATENT DOCUMENTS

DE 2039370 A1 2/1972
EP 0 439 980 8/1991
(Continued)

OTHER PUBLICATIONS

M.G. Kamath et al, "Absorption Properties", Apr. 2004, University of Tennessee http://www.engr.utk.edu/mse/Textiles/Absorption.htm.*

(Continued)

*Primary Examiner* — Frantz Jules
*Assistant Examiner* — Keith Raymond
(74) *Attorney, Agent, or Firm* — Posz Law Group, PLC

(57) ABSTRACT

An absorbent adapted to be used in a spray can charged with a liquefied gas, which exhibits excellent absorbing performance and excellent liquid retention. The absorbent is composed of an assembly of pulverized cellulose fibers that includes at least 45 mass % of fine cellulose fibers having a fiber length of 0.35 mm or less. The absorbent is formed into a sheet-shaped or a columnar configuration, or a surface sheet is laminated on a surface of the absorbent. The absorbent composed of 70 through 90 mass % of cellulose fibers that include 45 mass % or more of fine cellulose fibers having a fiber length of 0.35 mm or less, and 5 through 30 mass % of a fusion-bondable resin exhibits good formability.

7 Claims, 1 Drawing Sheet

(a)

(b)

(c)

(56) References Cited

FOREIGN PATENT DOCUMENTS

| | | |
|---|---|---|
| FR | 2 580 376 | 10/1986 |
| FR | 2 700 602 | 7/1994 |
| JP | 52-2107 Y1 | 1/1977 |
| JP | 57-141000 A | 8/1982 |
| JP | 60-19921 B2 | 5/1985 |
| JP | 63-44763 B2 | 9/1988 |
| JP | 4-202895 A | 7/1992 |
| JP | 6-212587 A | 8/1994 |
| JP | 10-245792 A | 9/1998 |
| JP | 2002-349792 A | 12/2002 |
| JP | 2005-206723 A * | 8/2005 |
| JP | 2005-206723 A | 8/2005 |
| JP | 10-245792 A * | 9/2008 |
| WO | WO 03/104540 | 12/2003 |

OTHER PUBLICATIONS

European Search Report dated Mar. 16, 2011 in corresponding EP Application No. 07860065.7.

International Search Report mailed on Jan. 22, 2008 for the corresponding International patent application No. PCT/JP2007/074836 (English translation enclosed).

* cited by examiner

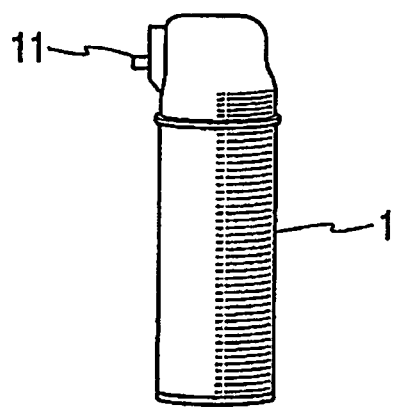
(a)
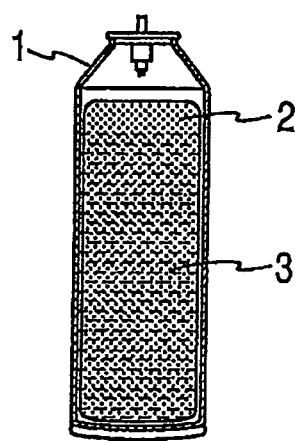
(b)
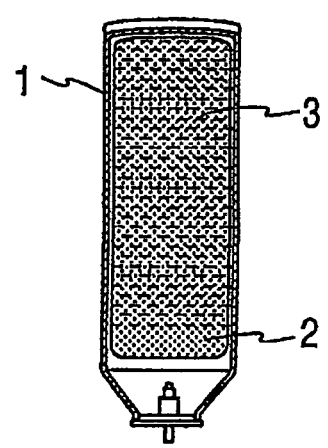
(c)

ABSORBENT FOR SPRAY CAN, PROCESS FOR PRODUCING ABSORBENT SHEET FOR SPRAY CAN, AND SPRAY CAN PRODUCT

CROSS REFERENCE TO RELATED APPLICATIONS

This application is a U.S. national stage application of PCT/JP2007/074836 filed on Dec. 25, 2007, and claims priority to, and incorporates by reference, Japanese Patent Application No. 2006-348736 filed on Dec. 26, 2006.

TECHNICAL FIELD

The present invention relates to an absorbent for retaining a liquefied gas, which is charged in an interior of a spray can. In addition, the present invention relates to a process for producing such an absorbent into a sheet, and a spray can product charged with such an absorbent.

The spray can product in accordance with the present invention is preferably used as a dust blower adapted to remove dust accumulated on various kinds of appliances by blowing off the same with a sprayed gas, a cylinder for use in a torch burner, such as a gas cylinder to be used for defrosting frozen water in water pipes, brazing, soldering, and making a fire with charcoal or wood pieces, etc.

BACKGROUND ART

The conventional dust blower adapted to remove dust accumulated on various kinds of appliances by blowing off the same with a sprayed gas, normally has the arrangement that a disposable metallic spray can having a spray button is charged with a propellant such as a compressed gas or a liquefied gas, and the above gas is sprayed by pushing the spray button.

Conventionally, a nonflammable fluorocarbon gas such as HFC 134a ($CH_2F$—$CF_3$) has been used as a propellant for the dust blower, but in recent years, an inflammable fluorocarbon gas such as HFC 152a ($CH_3$—$CHF_2$), which exhibits a smaller global warming potential, dimethyl ether (DME) exhibiting a very small global warming potential without causing any depletion of the ozone layer, etc. have been used as such a propellant.

The torch burner used in various works with flames is normally provided with a cartridge-type gas cylinder (metallic can-shaped pressure-resistant container) that is charged with fuel such as an inflammable gas, a liquefied fuel gas, etc., and the fuel is burnt by introducing the fuel injected from a nozzle of the cylinder into the burner.

A liquefied petroleum gas (LPG) and dimethyl ether (DME), etc., each exhibiting a high calorific value, emitting only a small amount of $CO_2$ in a combustion exhaust gas, as compared with petroleum oil and coal, and causing no depletion of the ozone layer, have been used as the fuel for the torch burner.

Where the spray can products such as dust blowers, cylinders for torch burners, etc., each being charged with a liquefied gas, are used in an inverted position, the liquefied gas may leak from nozzles thereof in a liquid phase. In particular, where dimethyl ether (DME), liquefied petroleum gas (LPG) and other inflammable liquefied gases are used, they are dangerous if leaking.

In order to solve these problems, conventionally, there have been proposed to provide techniques of mixing carbon dioxide gas in dimethyl ether to give incombustibility thereto, or charging a spray can for a dust blower with an absorbent adapted to retain a liquefied gas charged therein (Patent document 1).

And, now, the absorbent for the spray can is normally provided by pulverizing waste papers, etc., wrapping the same with a nonwoven fabric, and forming the wrapped waste paper into a cylindrical configuration, or molding a foamed urethane and an urethane foam into such a configuration.

Patent documents 2 through 4 disclose prior art relating to the provision of fine cellulose fibers.

Patent document 1: Publication of unexamined Patent Application No. 2005-206723

Patent document 2: Publication of examined Patent Application No. Sho60-19921

Patent document 3: Publication of examined Patent Application No. Sho63-44763

Patent document 4: Publication of unexamined Patent Application No. 06-212587

DISCLOSURE OF THE INVENTION

Problem to be Solved with the Invention

However, the pulverized waste papers have been subjected to recycling once or more times, and consequently, include damaged fibers so that the liquid retaining force thereof is not good. In addition, since the quality of raw materials scatters, the liquid retaining force may not become constant, and the necessary amount of the absorbent for every can may not become constant. And, in many cases, impurities such as a printing ink, etc. have adhered to the waste papers so that surfaces of fibers are likely to repel liquid, thereby degrading the liquid absorbability. Consequently, when the spray can is used in an inverted position, liquid may leak therefrom. In addition, when the can is stored in an inverted position, liquid may leak therefrom. And, various kinds of ink components included in the waste papers are dissolved in a liquefied gas or react therewith to color the liquefied gas, thereby causing coloring troubles due to the colored liquefied gas when injected.

For these reasons, an absorbent exhibiting better absorbing performance and better liquid retention has been demanded as an absorbent for use in a spray can charged with a liquefied gas.

Means for Solving Problem

In order to solve the above-described problems, the present invention has the following arrangement.

Namely, a first aspect of the present invention is an absorbent composed of a pulverized cellulose fiber assembly, and more specifically, is an absorbent for a spray can, which includes at least 45 mass % of fine cellulose fibers having a fiber length of 0.35 mm or less.

The absorbent in accordance with the first aspect of the present invention includes fine fibers in a predetermined composition ratio, which have a fiber length of a predetermined length or less, and are obtained by pulverizing cellulose fibers with mechanical or chemical means, and is excellent in absorbing performance and liquid retention. Consequently, the absorbent in accordance with the first aspect absorbs and retains a liquefied gas as a propellant, etc., which is adapted to be charged in a spray can, to prevent leakage thereof, thereby improving the safety of the spray can.

A second aspect of the present invention is an absorbent for a spray can, which has features of the first aspect of the present invention, and further has the feature that the fine cellulose fibers exhibit a water retaining force of at least 210%.

Where the fine cellulose fibers exhibiting a water retaining force of at least 210% are used, the absorbent excellent in absorbing performance and liquid retention can be readily obtained.

A third aspect of the present invention is an absorbent for a spray can, which has features of the first aspect or the second aspect of the present invention, and further has the feature that the absorbent is formed into a sheet-shaped configuration.

The sheet-shaped absorbent can have a freely selected configuration so as to be readily charged in the spray can with a desired configuration.

A fourth aspect of the present invention is an absorbent for a spray can, which has features of the first aspect or the second aspect of the present invention, and further has the feature that the absorbent is formed into a columnar configuration.

The absorbent can be formed into a columnar configuration with dimensions suited to an inside diameter of the spray can so that the absorbent can be readily charged in the spray can and is retained therein stably.

A fifth aspect of the present invention is an absorbent for a spray can, which has features of one of the first aspect through the fourth aspect of the present invention, and further has the feature that the absorbent is composed of 70 through 90 mass % of cellulose fibers that include at least 45 mass % of fine cellulose fibers having a fiber length of 0.35 mm or less, and 5 through 30 mass % of a fusion-bondable resin.

Where the fusion-bondable resin is mixed in the absorbent composed of cellulose fibers, the fibers can be fusion-bonded to each other by heating, thereby facilitating the formation of the absorbent. At this time, where the composition ratio of the cellulose fibers and the fusion-bondable resin is determined in the above-described composition range, good formability can be obtained without obstructing good liquid retention.

A sixth aspect of the present invention is an absorbent for a spray can, which has features of one of the first aspect through the fifth aspect of the present invention, and further has the feature that a surface of the absorbent is covered with a surface sheet.

Where the surface sheet adapted to cover the surface of the absorbent is used, the absorbent can be readily handled, and can be held stably in the spray can.

A seventh aspect of the present invention is a process for producing an absorbent sheet for a spray can, which includes steps of drawing out a surface sheet on a mesh conveyer, defibrating cellulose fibers with a dry web forming device to obtain cellulose fibers including 45 through 100 mass % of fine cellulose fibers having a fiber length of 0.35 mm or less, blending 70 through 95 mass % of the obtained cellulose fibers and 5 through 30 mass % of a fusion-bondable resin, further mixing the blended material in the air, continuously accumulating the mixed material on the surface sheet to form a web, further drawing out another surface sheet on the web as a lamination layer, and heating the web in a heating furnace, thereby bonding the web to the surface sheets.

Where the surface sheets adapted to cover surfaces of the absorbent are used, the absorbent can be readily handled and can be retained stably in the spray can.

An eighth aspect of the present invention is a spray can product wherein an absorbent for a spray can, which has features of one of the first aspect through the sixth aspect of the present invention, is charged in a spray can along with an inflammable liquefied gas.

Where the absorbent in accordance with the present invention is charged in a spray can, the inflammable liquefied gas can be preferably retained to restrain the leakage thereof.

A ninth aspect of the present invention is a spray can product that has features of the eighth aspect of the present invention, and further has the feature that the inflammable liquefied gas is dimethyl ether or a liquefied petroleum gas.

Examples of the inflammable liquefied gas include dimethyl ether and a liquefied petroleum gas, and dimethyl ether is used in dust blowers, whereas liquefied petroleum gas is used in cylinders for torch burners, etc. to enhance the safety thereof.

Effects of the Invention

As described above, in accordance with the present invention, an absorbent exhibiting better absorbing performance and better liquid retention can be obtained as the absorbent for use in a spray can product charged with a liquefied gas.

BEST MODE FOR CARRYING OUT THE INVENTION

Hereinafter, the absorbent for the spray can in accordance with the present invention will be explained in more detail.

The absorbent for the spray can in accordance with the present invention is mainly composed of pulverized cellulose fibers, and the pulverized cellulose fibers include at least 45 mass % of fine cellulose fibers having a fiber length of 0.35 mm or less.

By determining the fiber length of the cellulose fibers to be 0.35 mm or less, the cellulose fibers are closely charged in the spray can as a fiber assembly, thereby improving the liquid retaining force. Where at least 45 mass % of the fine cellulose fibers having a fiber length of 0.35 mm or less are not included, the absorbent is inferior in absorbing performance and liquid retention so that the liquid leakage prevention effect cannot be sufficiently achieved where the spray can is in an inverted position.

In accordance with the present invention, the term "fiber length" refers to the average fiber length measured with the fiber length analyzer FS-200 (Kajaani Process Measurements Ltd.).

The fine cellulose fibers having a fiber length of 0.35 mm or less, which are included in the absorbent in accordance with the present invention, are produced by pulverizing cellulose fibers as a raw material with mechanical and/or chemical means. By pulverizing the cellulose fibers, fine fibers with a large surface area can be obtained, whereby the liquid retention is improved.

Examples of the cellulose fibers as a raw material of the absorbent of the present invention include cellulose fibers of an arbitrary raw material such as a bleached or unbleached softwood or hardwood chemical pulp, a dissolving pulp, a waste paper pulp, cotton, etc. By pulverizing these cellulose fibers to obtain fibers having a predetermined fiber length, they can be used as the absorbent in accordance with the present invention. In particular, a bleached softwood kraft pulp (NBKP) and a bleached hardwood kraft pulp (LBKP) are excellent, because they exhibit good absorbing properties and good liquid retention, and do not cause any coloring of a liquefied gas, so as to be preferably used.

With respect to the waste paper pulp, the liquid retention of fibers thereof is slightly inferior, and there occurs the problem that a printing ink is attached to the fibers thereof, for example, but it has advantages such as low manufacturing costs, a small environmental load, etc. Where the waste paper pulp is used, in order to obtain a desired liquid retention, it is desirable to increase the content or the charging amount of the fine cellulose fibers having a fiber length of 0.35 mm or less, or adopt various configurations as follows. In addition, the waste paper pulp can be used along with other raw material pulps without being used solely.

In order to mechanically pulverize cellulose fibers as a raw material, a high-speed impact pulverization method such as a rotary mill, a jet mill, etc., a roll crusher method, etc. have been mainly used. In addition, cellulose is an organic substance and accordingly is soft so that it is difficult to obtain fine cellulose particles with only the mechanical pulverization treatment, and in order to obtain fine cellulose fibers, a combination method of the chemical treatment and the mechanical pulverization has been generally used.

The combination method of the chemical treatment and the mechanical pulverization will be explained. It is generally known that cellulose is composed of a crystal region and a non-crystal region, and that the non-crystal region exhibits readily reactive properties on chemicals. It is known from these facts that by reacting cellulose on mineral acids, as the chemical treatment, the non-crystal region thereof liquates out, and consequently, the cellulose fibers mainly composed of a crystal part are obtained. And by further mechanically treating the cellulose fibers mainly composed of the crystal part, fine cellulose particles can be obtained. More specifically, there is the method of hydrolyzing a bleached pulp to a slight degree with acid, filtering, washing, drying and pulverizing the same, thereby producing cellulose fine particles, each partially including the crystal region. Alternatively, the method of hydrolyzing a refined pulp with hydrochloric acid or sulfuric acid and finely pulverizing only the crystal region thereof can be also adopted.

In accordance with the present invention, the cellulose fibers as a raw material are pulverized by the above-described mechanical means, chemical means or the combination method of the chemical means and the mechanical means so as to include at least 45 mass % of fine cellulose fibers having a fiber length of 0.35 mm or less. More specifically, by arbitrarily selecting the mechanical or chemical means upon pulverizing the cellulose fibers as the raw material, they can be pulverized so as to include at least 45 mass % of fine cellulose fibers having a fiber length of 0.35 mm or less.

In addition, it is preferable that the fine cellulose fibers having a fiber length of 0.35 mm or less can be included in at least 45 mass % by classifying the cellulose fibers previously pulverized using the mechanical or chemical means, or mixing another cellulose fibers to the classified fine cellulose fibers.

The cellulose fibers recovered from a bag filter upon producing a pulp air laid nonwoven fabric include a large amount of fine cellulose fibers so as to be preferably used as the raw material cellulose fibers or cellulose fibers to be mixed. As a result, the producing process can be made simple.

The cellulose fiber assembly composing the absorbent in accordance with the present invention exhibits desired absorbing properties and liquid retention without using any pulverizing means, provided that at least 45 mass % of fine cellulose fibers having a fiber length of 0.35 mm or less is included therein, but, alternatively, the wet-type pulverizing method can be also used as the method capable of readily making the cellulose fibers subjected to the pulverizing treatment fine, and readily adjusting the properties such as fiber width, fiber length, water retaining force, etc.

According to a well known method for producing cellulose fibers having a fine fiber width, cellulose is changed to fine cellulose without causing any substantial chemical change in a starting material of cellulose by the step of passing a suspension of cellulose fibers through a small diameter orifice to impart an elevated speed to the suspension with a pressure difference of at least 3000 psi, and making the same collide to decelerate the same rapidly, thereby carrying out the cutting operation, and the step of repeating the above-described step to form a suspension which is substantially stable from the cellulose suspension, which corresponds to the method for treating a suspension of cellulose fibers with a high-pressure homogenization device (high pressure homogenizer) (See Patent Document 2 and Patent Document 3).

In addition, cellulose fibers can be also pulverized with a medium-stirring type wet pulverizer as the method capable of effectively minimizing the cellulose fibers with a shear force generated with a speed difference between media, based on the minimizing operation mechanisms (size reduction operation) of the cellulose fibers with the high-pressure homogenization device, in particular, shearing operation, cutting operation and friction operation (See Patent document 4).

The medium-stirring type wet pulverizer is the device by which media and cellulose fibers charged in a stationary pulverization container are stirred by rotating a stirring machine inserted in the pulverization container, thereby generating a shear stress to pulverize the cellulose fibers therewith. There are a tower-type, a tank-type, a feed tube-type, a manular-type, and other types of pulverization devices. Any device of these types can be used provided that a medium stirring mechanism is used. In particular, a sand grinder, an ultra visco mill, a dyno mill, and a diamond fine mill are preferable.

Available examples of the medium include glass beads, alumina beads, zirconia beads, zircon beads, steel beads, titania beads, etc., and the average particle diameter of available media ranges from 0.1 mm to 6 mm. The kind and the average particle diameter of the available media along with the treatment conditions such as the rotation speed of the pulverizer, the treating concentration, etc. can be arbitrarily selected according to desired physical properties of the fine cellulose fibers. In addition, any one of the batch-type method and the continuous type method may be used, and several devices may be connected in series such that cellulose is pulverized rough in a first stage, and then, pulverized fine in following stages.

In the case of the bleached hardwood kraft pulp as one example of the cellulose fibers, an untreated pulp thereof has a fiber width ranging from 20 to 30 μm with an average fiber length against weight load of about 0.8 mm and a smooth and flat cylindrical configuration that is twisted or bent.

By treating such a pulp with the above-described pulverizing device, etc., pulverized cellulose including a large amount of fine cellulose fibers having a fiber length of 0.35 mm or less can be readily obtained. The pulverized cellulose thus obtained can be formed very fine such that the fiber width is 0.15 μm or less and the number average fiber length is 0.25 mm or less.

In addition, in accordance with the present invention, fine cellulose fibers with a water retaining force of at least 210% are preferably used as the fine cellulose fibers composing the absorbent. With this arrangement, the absorbent for the spray can, which is excellent in absorbing performance and liquid retaining force, can be obtained so as to be more preferable.

Hereinafter, the water retaining force will be explained.

The fine cellulose fibers to be used in the present invention have a smaller fiber length so as to exhibit characteristics different from those of normally available pulp fibers, and consequently exhibit drastically excellent absorbing performance and liquid retaining force. This is probably because the fine cellulose fibers can exhibit properties such as an increased viscosity, an increased affinity with water, and an increased water retaining ability (water retaining force).

The water retaining force is measured by the following method.

Samples of cellulose fibers are dehydrated by a centrifugal treatment with 3000 G for 15 minutes, using a cylindrical centrifugal tube having an aperture in a bottom thereof and provided with a glass filter of G3, and then, treated samples are removed and the mass of the cellulose samples is measured. And, these samples are dried at 105° C. for at least 5 hours to measure the dry mass thereof.

The water retaining force is the value obtained by reducing the dry sample mass from the sample mass in a wet state after the centrifugal treatment, dividing the reduced value by the dry sample mass, and multiplying the divided value by 100.

Where the water retaining force of the fine cellulose fibers to be used in the present invention is compared with that of a normally beaten pulp, the following results are obtained.

For example, the cellulose fibers pulverized with the above-described medium-stirring type wet pulverizer normally exhibit a water retaining force of at least 210%. They exhibit ability as high as 300% or more according to pulverizing conditions. In contrast, the water retaining force of the normally beaten pulp is lower than the above-described force.

For example, the pulp fibers that were prepared by beating a bleached softwood kraft pulp (freeness is 710 ml and water retaining force is 51% before treated) with a refiner at a treating concentration of 2% so as to exhibit freeness (measured according to TAPPI standard T227 m-58) of 375 ml, 254 ml, 61 ml and 30 ml exhibited a water retaining force of 138%, 151%, 181% and 195%, respectively.

And the pulp fibers that were prepared by treating a softwood sulfite kraft pulp (freeness is 705 ml and water retaining force is 72% before treated) with a Niagara beater at a treating concentration of 2% so as to exhibit freeness of 380 ml, 210 ml and 45 ml exhibited a water retaining force of 161%, 182% and 208%, respectively.

In addition, in the case of the mechanical pulp, a pressure-type ground pulp exhibited freeness of 60 ml and a water retaining force of 145%.

The absorbent for the spray can product (dust blowers and cylinders for torch burners) in accordance with the present invention is composed of a pulverized cellulose fiber assembly of fibers obtained by the above-described method, and includes at least 45 mass % of fine cellulose fibers having a fiber length of 0.35 mm or less. The fiber assembly can be charged in the spray can by an arbitrarily selected method. Therefore, by adjusting the obtained pulverized cellulose fibers to include a predetermined amount of fine cellulose fibers, and directly charging a predetermined amount of the pulverized cellulose fibers in the spray can according to the dimensions of the spray can, the absorbent for retention of liquid in accordance with the present invention can be obtained.

In addition, by previously assembling a fixed amount of the pulverized cellulose fibers, a fiber assembly can be also formed. It is more preferable to use this fiber assembly as the absorbent for retention of liquid, and charge the same in the spray can in view of the workability and productivity. The fibers can be assembled by charging the pulverized cellulose fibers in bags made of sheets such as papers, nonwoven fabrics, etc., each exhibiting predetermined air permeability. By charging the fibers in the bags, formed bodies having predetermined configurations can be produced, thereby preventing the scattering of fibers in the producing step.

Where produced into a columnar formed body with dimensions conforming to the inside diameter of the spray can, it can be readily charged in the spray can, and stably retained therein during use.

In addition, the fiber assembly obtained by forming the pulverized cellulose fibers into a predetermined configuration with application of pressure can be used as the absorbent for retention of a propellant.

In this case, a preferred configuration of the absorbent is a sheet-shaped configuration. The absorbent produced by forming the pulverized cellulose fibers into the sheet-shaped configuration can be directly charged in the spray can, but, since the sheet-shaped configuration can be readily curved, after folding or winding the sheet-shaped absorbent into a columnar configuration conforming to the inside diameter of the spray can, it can be charged in the spray can.

Another preferred configuration of the absorbent in accordance with the present invention is a columnar configuration. After forming the pulverized cellulose fibers into a columnar configuration with a diameter suited to the inside diameter of the spray can, the columnar formed body can be charged in the spray can.

In order to form the absorbent composed of the pulverized cellulose fibers, it is necessary to bond the fibers to each other. Therefore, in order to obtain such an absorbent, it is desirable to add a material serving as a binder to a forming material.

More specifically, it is possible to adhere a binder such as a water-soluble resin to the pulverized cellulose fibers by the spraying method, etc., and accumulate it in a sheet-shaped configuration, or dry it while being placed in a forming die.

The binder can be selected arbitrarily according to needs. Examples of the binder include an aqueous solution-type binder such as casein, sodium alginate, hydroxyethyl cellulose, carboxymethy cellulose sodium salt, polyvinyl alcohol (PVA), polyacrylic acid sodium, etc., and an emulsion-type binder such as emulsions such as polyacrylic acid ester, acryl•styrene copolymer, polyvinyl acetate, ethylene, vinyl acetate copolymer, acrylonitryl•butadiene copolymer, methyl metaaclylate•butadiene copolymer, etc., styrene•butadiene copolymer latex, etc.

But, with this method, the surface of the fiber is coated with the binder, the performance of the absorbent may deteriorate, as compared with the case of no binder being used.

The pulverized cellulose fibers can be formed into a predetermined configuration by mixing a fusion-bondable resin in the pulverized cellulose fibers, and heating a mixture to fusion-bond the fibers to each other without using any binder. With this method, any binder, etc. do not adhere to surfaces of the fibers except for those in bonding areas of the cellulose fibers and the fusion-bondable fibers so that the absorbing performance of the absorbent does not deteriorate. In addition, this method is excellent in productivity, too so as to be preferable as the method for forming the absorbent in accordance with the present invention.

In this case, it is more desirable that the absorbent is composed of 70 through 95 mass % of cellulose fibers including at least 45 mass % of fine cellulose fibers having a fiber length of 0.35 mm or less, and 5 through 30 mass % of a fusion-bondable resin.

Where the content of the fusion-bondable resin is less than 5 mass %, the bonding of the fibers composing the absorbent may become insufficient, thereby causing troubles such as production of a large amount of paper dust, etc. Whereas when the content of the fusion-bondable resin exceeds 30 mass %, the absorbing properties and the liquid retention of the absorbent are deteriorated.

Well known various kinds of resins can be used as the fusion-bondable resin, and arbitrary materials can be used according to circumstances. Examples thereof include olefin fibers such as polyethylene (PE), polypropylene (PP), etc., polyester (PET) fibers, nylon fibers, etc. In addition, a complex fiber composed of a combination of synthetic resins having different melting points can be used. Examples of the combination of resins in the complex fiber include PE/PP, PE/PET, PP/PET, low melting point PET/PET, low melting point PP/PP, nylon-6/nylon-66, PP/PVA, PE/PVA, etc. The kind thereof can be arbitrarily selected. And, there are a side-by-side-type complex fiber in which different resins are spun in parallel, a sheath core type complex fiber in which a low melting resin is spun in an outside position thereof, and a high melting point resin is spun in an inside position thereof, etc., and any one of these fibers is available.

And the fusion-bondable resin may take a granular configuration, but where it takes the fiber-shaped configuration, it is tangled with cellulose fibers so as to be difficult to come off the same, whereby merely a small amount of the fiber-shaped fusion-bondable resin can bond fibers by heat, which is more desirable.

The fiber length and the fiber diameter of various kinds of synthetic resins to be used as the fusion-bondable resin can be arbitrarily selected, but normally, synthetic resins, each having a fiber length ranging from 2 to 6 mm, and a fiber diameter ranging from 1 to 72 dt, preferably from 1 to 5 dt, can be used preferably.

In accordance with the present invention, it is desirable that the surface of the absorbent is covered with a surface sheet. In order not to obstruct the liquid absorbing properties of the absorbent, a sheet exhibiting air permeability, such as a sheet of paper, a nonwoven fabric, etc., is used as the surface sheet. The preferable weight of such a sheet ranges from 12 to 50 g/m$^2$. More specifically, examples of the nonwoven fabric include an air laid nonwoven fabric, a thermal bond nonwoven fabric, a spunlace nonwoven fabric, a spunbond nonwoven fabric, an air-through nonwoven fabric, a wet type nonwoven fabric, etc. and examples of the paper include tissue, kraft paper, crepe paper, etc. In accordance with the present invention, in particular, tissue, air laid nonwoven fabric, spunbond nonwoven fabric, etc. are preferably used.

In accordance with the present invention, the absorbent for retention of liquid is covered with the surface sheet by forming the sheet of paper, nonwoven fabric, etc. into a bag-shaped configuration, and putting a fiber assembly of pulverized cellulose fibers in this bag. With this method, the entire surface of the absorbent is covered with the surface sheet, the workability is good, and the absorbent readily achieves its performance so that this method is preferably carried out. And upon forming the absorbent into a sheet-shaped configuration with the formation of webs, the sheets composed of these papers, nonwoven fabrics, etc. are used as the surface material for the absorbent sheet, so as to serve as the surface sheet covering the surface of the absorbent.

In accordance with the present invention, it is possible to mix the pulverized cellulose fibers and the fusion-bondable fibers in a desired mixing ratio, and form the sheet-shaped absorbent with the conventionally well known web forming method.

Examples of the web forming method include the wet papermaking method, the air laid method of dispersing a raw material in the air to cause foaming thereof (representative producing processes are J&J method, K-C method, Honshu method (Kinocloth method), etc.), carding method, etc.

The absorbent sheet in accordance with the present invention can be obtained by partially melting the fusion-bondable fibers of the web formed with these methods with a conventionally well known heat treating device to bond the fusion-bondable fibers to each other, and bond the cellulose fibers to the fusion-bondable fibers. The heat treating method is not specifically limited, but for example, the following heat treating devices can be used. Namely, drying devices such as the through-air drier, Yankee drier, multi-cylinder drum drier, etc., or calendering device such as the thermal calendering device, the thermal embossing device, etc.

More specifically, the sheet-shaped absorbent of the present invention is obtained by the web forming method, as follows. First, a surface sheet is drawn out on a mesh conveyer, cellulose fibers were defibrated with a dry web forming device to obtain cellulose fibers including 45 through 100 mass % of fine cellulose fibers having a fiber length of 0.35 mm or less, 70 through 95 mass % of the obtained cellulose fibers and 5 through 30 mass % of a fusion-bondable resin are blended, and the blended material is further mixed in the air, and is continuously accumulated on the surface sheet to form a web. Another surface sheet is further drawn out on the web as a lamination layer, and the web is heated in a heating furnace, thereby bonding the web to the surface sheets. This method is preferably used.

The absorbent in accordance with the present invention is charged in an interior of the spray can, and is preferably used as the absorbent for retaining a liquefied gas.

The spray can charged with the absorbent in accordance with the present invention is preferably used as a spray can product adapted to retain an inflammable liquefied gas in an interior thereof, and achieves an effect of restraining liquid leakage. Examples of the spray can product to be charged with the inflammable liquefied gas include a dust blower for removing dust attached to various kinds of appliances by blowing off the same with a sprayed gas, and a cylinder for use in a torch burner (that is a gas cylinder to be used upon thawing out water pipes, soldering, brazing, making a fire with charcoal and wood pieces). The spray can in accordance with the present invention can be also used for other purposes than these ones.

Hereinafter, the case where the spray can product in accordance with the present invention is applied to a dust blower will be explained as a representative example.

The dust blower is provided by charging at least a propellant and an absorbent of the present invention adapted to retain the propellant in a disposable metallic spray can having a spray button, and by pushing the spray button, gas is sprayed to remove dust.

The propellant for the dust blower preferably contains dimethyl ether (DME) as an inflammable liquefied gas.

Dimethyl ether (DME) as the component of the propellant is the simplest ether expressed with the chemical formula of $CH_3OCH_3$, a colorless air having a boiling point of $-25.1°$ C., and chemically stable, and exhibits a low saturated vapor pressure, that is, 0.41 MPa at 20° C., and 0.688 MPa at 35° C. Consequently, upon applying pressure, it is readily liquefied so as to be used by charging the same in a metallic spray can exhibiting a relatively low compression strength without using a container with a high compression strength.

Dimethyl ether (DME) as the component of the propellant exhibits a ozone depleting potential as small as 0, and a global warming potential as small as 0.2. When sprayed, the decomposition time in the air is about several tens of hours so as not to cause any greenhouse effect or any depletion of the ozone layer, and consequently, it is useful as the propellant with a smaller environmental load, as compared with the conventional fluorocarbon gas, alternatives to fluorocarbon (HFC134a ($CH_2F$—$CF_3$ as a nonflammable fluorocarbon gas and HFC 152a ($CH_3$—$CHF_2$) as an inflammable fluorocarbon gas). And in accordance with the present invention, the propellant is absorbed by and retained in the absorbent with a specific structure so that the effect of restraining leakage of a liquefied gas can be achieved to greatly improve the safety of the dust blower containing an inflammable component of the propellant.

Dimethyl ether (DME) can be used as the propellant of the dust blower solely or as a mixture with other components of the propellant. Where the propellant is composed of only dimethyl ether that is inflammable, flames may be generated when used in the vicinity of fire, but by mixing other components such as carbon dioxide gas in the propellant, fire-retardant properties can be exhibited. Carbon dioxide gas ($CO_2$) is a nonflammable gas, has a boiling point as low as −8.5° C., and exhibits a high saturated vapor pressure, that is, 5.733 MPa at 20° C., and about 8.32 MPa at 35° C. And it well dissolves in dimethyl ether (DME) so as to lower the possibility of the generation of flames, and raise the spraying pressure when charged as a mixture liquefied gas. At this time, the mixing amount of carbon dioxide gas may be arbitrarily adjusted so as to exhibit a desired product pressure.

Dimethyl ether (DME) and carbon dioxide gas as the component of the propellant are very inexpensive, as compared with fluorocarbon and alternatives to fluorocarbon. Where carbon dioxide gas generated as a by-product during the step of refining oil, etc., or normally existing in the air is used secondarily, similarly to the case of a dry ice, etc. it is advantageous in cost, and is environmentally friendly. Namely, when carbon dioxide gas is newly produced, there occurs the problem of the emission of the greenhouse gas in the air, but by using carbon dioxide gas already existing in the air, the effect of reducing the amount of carbon dioxide gas in the air can be achieved. Even when carbon dioxide gas is emitted by spraying, the influence on the global warming (global warming potential of carbon dioxide gas=1) is much smaller than that of the conventional alternatives to fluorocarbon.

FIG. 1 shows one example of the spray can product to which the present invention is applied. FIG. 1 (*a*) and FIG. 1(*b*) are respectively a side view and a longitudinal sectional view of a dust blower as the spray can product. As shown, an absorbent (a special absorbent 2) for retaining a propellant, which is provided by charging cellulose fibers pulverized so as to include 45 mass % of fine cellulose fibers having a fiber length of 0.35 mm or less in a bag of a nonwoven sheet, is accommodated in a spray can 1 having a spray nozzle 11 in a side surface of a head part thereof. The special absorbent 2 has a columnar configuration with a diameter approximately equal to the inside diameter, the height thereof is less than that of a main part of the spray can 1 with a space remained on the side of the head part thereof. A liquefied gas 3 as a propellant is accommodated in an interior of the spray can 1 with retained with the pulverized cellulose fibers composing the special absorbent 2 along with gaps between fibers.

The dust blower to which the present invention is applied is arranged such that the liquefied gas 3 is retained with the special absorbent 2, and consequently, it exhibits extremely high liquid retention. Therefore, where dimethyl ether (DME) as an inflammable liquefied gas or a mixture liquefied gas of dimethyl ether (DME) and carbon dioxide gas is used as the propellant, only a vaporized gas is sprayed from the spray nozzle 11 so as not to cause catching of fire. In addition, since the available spraying angle is not specifically limited, liquid leakage can be effectively restrained while used in an inclined state or an inverted state, or while stored.

Where the spray can product in accordance with the present invention is applied to a cylinder for use in a torch burner, the basic arrangement is similar to the case of the dust blower, and a gas cylinder having a configuration like a spray can is charged with an inflammable liquefied gas as fuel in place of the propellant of the dust blower, along with the absorbent in accordance with the present invention, which is adapted to retain fuel. The cylinder is a pressure-resistant container having a spray part for fuel, and made of metal, and by supplying fuel to a burner connected to a head part thereof and burning the fuel, various kinds of works using flames are carried out.

A liquefied petroleum gas (LPG) having a high calorific value, and emitting a smaller amount of $CO_2$ in an exhaust gas, as compared with oil and coal, so as not to harm the ozone layer, is preferably used as the fuel for the torch burner. Dimethyl ether (DME) and other inflammable liquefied gases can be also used as a mixture or solely. In such cases, the absorbent charged in cylinders absorbs and retains the liquefied gas so that liquid leakage can be effectively restrained while used in an inclined state or an inverted state, or while stored.

As described above, the absorbent in accordance with the present invention, which is charged in a spray can, exhibits greatly improved absorbing performance and liquid retention, and consequently, the safety of the spray can product such as the dust blower, the cylinder for the torch burner, etc., which uses the inflammable liquefied gas can be enhanced. As a result, the inflammable liquefied gas such as dimethyl ether (DME), etc., which is small in ozone depleting potential and global warming potential, can be used safely, whereby spray can products with high quality, of which the load on the global environment is small, can be provided at a low price.

Embodiments

Hereinafter, the present invention will be explained in more detail based on embodiments that were carried out to confirm the effects of the present invention.

<Embodiment 1>

(1) Production of Fine Cellulose Fibers

A suspension was prepared by adding bleached hardwood kraft pulp (LBKP) on the market to water to the concentration of 1.5%, and 120 g of the prepared suspension was subjected to wet pulverization by a 6 cylinder sand grinding machine (manufactured by Imex Company, with treating volume of 300 ml) in which 125 ml of glass beads having an average particle diameter of 0.7 mm were put as media at 2000 rpm as the number of revolution of a stirrer and for 40 minutes while adjusting the treating temperature to about 20° C.

The fiber length of LBKP on the market before treatment was 0.61 mm, the fiber width thereof was 20 μm, and the water retaining force thereof was 44%. In contrast, the number average fiber length of the cellulose fibers after treatment was 0.25 mm, the fiber width thereof ranged from 1 to 2 μm, and the water retaining force thereof was 288%, so that with the wet pulverization, pulverized cellulose fibers including a large amount of fine cellulose fibers having a fiber length of 0.35 mm or less can be obtained.

(2) Production of Absorbent 85 g of fibers prepared by blending 55 mass % of cellulose fibers obtained by defibrating LBKP on the market with a dry type defibrating device, with 45 mass % of the pulverized cellulose fibers including a large amount of the fine cellulose fibers obtained in the process (1) were charged in a cylindrical bag composed of a thermal bond nonwoven fabric (manufactured by FUKUSUKE KOGYO CO., LTD., brand name: D-01518) of 18 g/m$^2$, thereby obtaining an absorbent having a generally columnar configuration with a diameter of about 6.3 cm.

Upon examining the distribution of the fiber length against an entire part of the cellulose fibers composing the absorbent, the ratio of the fine cellulose fibers having a fiber length of 0.35 mm or less was 48 mass %.

<Embodiment 2>

An absorbent was obtained in a similar manner to Embodiment 1, except that the composition ratio of the fine cellulose fibers was determined to be 60 mass %.

The ratio of the fine cellulose fibers having a fiber length of 0.35 mm or less to the entire part of the cellulose fibers composing the absorbent was 72 mass %.

<Embodiment 3>

Cellulose fibers including 45 mass % of fine cellulose fibers (fiber length of 0.35 mm or less) were obtained by defibrating LBKP on the market with a dry type defibrating device and classifying the obtained cellulose fibers.

An absorbent was obtained in a similar manner to Embodiment 1, except that the above-described cellulose fibers were used.

<Embodiment 4>

Cellulose fibers including 60 mass % of fine cellulose fibers (fiber length of 0.35 mm or less) were obtained by defibrating LBKP on the market with a dry type defibrating device and classifying the obtained cellulose fibers.

An absorbent was obtained in a similar manner to Embodiment 1, except that the above-described cellulose fibers were used.

<Embodiment 5>

Cellulose fibers including at least 45 mass % of fine cellulose fibers (fiber length of 0.35 mm or less) were obtained by defibrating LBKP on the market with a dry type defibrating device and classifying the obtained cellulose fibers. 70 mass % of the above-described cellulose fibers and 30 mass % of fusion-bondable fibers (PE/PET sheath type fusion-bondable fibers, fiber length: 5 mm, fiber diameter: 2.2 dt, manufactured by CHISSO CORPORATION, brand name: ETC) were blended, and homogeneously mixed in the air, and an obtained mixture was dropped and accumulated on a surface sheet (tissue paper, 14 g/m², thickness: 0.15 mm, manufactured by NITTOKU CO.) drawn out on an endless mesh-shaped conveyer that is running, with an air laid type web forming device along with an air flow.

Another surface sheet identical to the above-described surface sheet was laminated to form a web. The web was passed through a through air drier of 138° C., and pressed to obtain an absorbent sheet of 340 g/m². The absorbent sheet thus obtained was formed into a coreless roll-shaped configuration (columnar configuration with a diameter of about 6.3 cm, 85 g), thereby obtaining an absorbent.

<Embodiment 6>

Cellulose fibers including at least 45 mass % of fine cellulose fibers (fiber length of 0.35 mm or less) were obtained by defibrating LBKP on the market with a dry type defibrating device and classifying the obtained cellulose fibers. 70 mass % of the above-described cellulose fibers and 30 mass % of fusion-bondable fibers (PE/PET sheath type fusion-bondable fibers, fiber length: 5 mm, fiber diameter: 2.2 dt, manufactured by CHISSO CORPORATION, brand name: ETC) were blended, and 85 g of the blended fibers were put in a forming die having a cylindrical configuration with a diameter of 6.3 cm and a height of 17 cm), and formed by applying pressure and heat, thereby obtaining an absorbent having a columnar configuration.

<Embodiment 7>

Cellulose fibers including at least 45 mass % of fine cellulose fibers (fiber length of 0.35 mm or less) were obtained by defibrating LBKP on the market with a dry type defibrating device and classifying the obtained cellulose fibers. The above-described cellulose fibers were dropped and accumulated on an endless mesh-shaped conveyer that is running, along with an air flow with an air laid type web forming device, thereby forming a web of 40 g/m². An EVA-based aqueous binder liquid was sprayed on the web with an air knife nozzle such that the solid part becomes 7 g/m², and was simultaneously sucked with a suction device from the lower side of the mesh-shaped conveyer.

The web to which the above-described binder had been sprayed was passed through a box-type hot-air drier of which the atmospheric temperature was determined to be 170° C., thereby bonding the fibers to each other. The web was inverted, an opposite surface to the surface first subjected to the spraying of the binder was subjected to the spraying with the binder, similarly, and the web was passed through the hot-air drier, thereby obtaining an absorbent sheet of 40 g/m². The absorbent sheet thus obtained was formed into a coreless roll configuration (columnar configuration with a diameter of about 6.3 cm, 85 g), thereby obtaining an absorbent.

<Embodiment 8>

Cellulose fibers including 50 mass % of fine cellulose fibers (fiber length of 0.35 mm or less) were obtained by defibrating waste newspapers with a dry type defibrating device. 85 g of the cellulose fibers was charged in a bag of a nonwoven fabric, similarly to Embodiment 1, thereby obtaining an absorbent.

Comparative Example 1

Cellulose fibers including 20 mass % of fine cellulose fibers (fiber length of 0.35 mm or less) were obtained by defibrating LBKP on the market with a dry type defibrating device and classifying the obtained cellulose fibers. An absorbent was obtained in a similar manner to Embodiment 1, except that the above-described cellulose fibers were used.

Comparative Example 2

Cellulose fibers including 40 mass % of fine cellulose fibers (fiber length of 0.35 mm or less) were obtained by defibrating waste newspapers with a dry type defibrating device. An absorbent was obtained by spreading 75 g of the above-described cellulose fibers on a nonwoven fabric over an entire surface thereof into a mat-like state, folding the same into two, forming the same into a columnar configuration, and fixing the same with a stapler.

Comparative Example 3

Cellulose fibers including 40 mass % of fine cellulose fibers (fiber length of 0.35 mm or less) were obtained by defibrating waste newspapers, similarly to Comparative example 2. An absorbent was obtained using 85 g of the above-described cellulose fibers, in a similar manner to Comparative example 2.

The absorbents obtained in these embodiments and comparative examples were respectively charged in spray cans along with dimethyl ether (DME) or a liquefied petroleum gas (LPG) as an inflammable liquefied gas, thereby producing spray can products, and they were evaluated with the following method. The evaluation results are shown in TABLE 1.

<Liquid Leakage Evaluation Test>

The absorbents obtained in the embodiments and the comparative examples were respectively charged in containers (outside diameter: 66 mm, height: 20 cm), each having a configuration identical to that of a spray can for use in a dust blower on the market, and after 350 ml of dimethyl ether (DME) was further charged in the containers, they were allowed to stand for 30 minutes. Then, the containers were inverted to spray charged gases, and the time until the liquid leakage occurred in spray parts of the containers was respectively measured.

Containers charged with the absorbents obtained in the embodiments and the comparative examples were further charged with 350 ml of a liquefied petroleum gas (LPG) in place of dimethyl ether (DME), and a similar test was carried out.

The samples in which the time until the liquid leakage occurs is 20 seconds or more are available as spray can products such as dust blowers, cylinders for use in torch burners, and were marked with "○", because they exhibit sufficient liquid retention as absorbents for use in spray cans. And the samples in which the liquid leakage occurs in less than 20 seconds cannot be used as dust blowers, and were marked with "X".

<Evaluation of Discoloration>

The absorbents obtained in the embodiments and the comparative examples and dimethyl ether (DME) were respectively put in test glass bottles for use in development of aerosols, sealed, and allowed to stand at room temperature for two weeks. Then, samples were evaluated whether DME were colored or not.

As shown in Table 1, spray can products using the absorbents of Embodiments 1 through 8, i.e., assemblies of the cellulose fibers, each including 45 mass % or more of fine cellulose fibers with a fiber length of 0.35 mm or less, as the absorbents for retaining an inflammable liquefied gas, were able to maintain the spraying for 20 seconds or more in an inverted state without generating liquid leakage.

These results show that the absorbents of the embodiments exhibit sufficient performance as the dust blower, because it is considered that the inflammable gas used as the propellant in the dust blower catches fire due to incomplete vaporization of a sprayed liquefied gas, that each spraying time scarcely exceeds 20 seconds upon normally used, and that when continuously sprayed for 30 seconds or more, the spray can cannot be held with bare hands due to the temperature drop with vaporization heat. As a result, there can be provided dust blowers enabling the free selection of a spraying angle, restraining occurrence of flames due to liquid leakage, and exhibiting high safety and excellent feeling upon used.

In contrast, in Comparative examples 1 through 3, each including less than 45 mass % of fine cellulose fibers having a fiber length of 0.35 mm or less, liquid leakage occurred in 2 through 10 seconds. In Comparative examples 2 and 3 using conventional absorbents composed of waste newspapers, in particular, Comparative example 2 including a smaller amount of the absorbent, the time until the liquid leakage occurred was shorter. In addition, in Comparative examples 2 and 3, coloring also occurred.

TABLE 1

| Item | Embodiment 1 | Embodiment 2 | Embodiment 3 | Embodiment 4 | Embodiment 5 | Embodiment 6 |
|---|---|---|---|---|---|---|
| Absorbent (g) | 85 | 85 | 85 | 85 | 85 | 85 |
| Test gas | DME/LPG | DME/LPG | DME/LPG | DME/LPG | DME/LPG | DME/LPG |
| Time until liquid leakage (sec) | 30 sec or more | 30 sec or more | 30 sec or more | 30 sec or more | about 25 sec | about 25 sec |
| Evaluation | ○ | ○ | ○ | ○ | ○ | ○ |
| Coloring | NO | NO | NO | NO | NO | NO |
| Raw material | LBKP | LBKP | LBKP | LBKP | LBKP | LBKP |
| Configuration | Columnar block charged in nonwoven fabric | | | | Coreless columnar roll from sheet | Columnar shape by applying heat and pressure |
| Covering material | Nonwoven fabric | Nonwoven fabric | Nonwoven fabric | Nonwoven fabric | Tissue paper | NO |
| Classification | — | — | Carried out | Carried out | Carried out | Carried out |
| Composition ratio of dry defibrated cellulose | 55 | 40 | 100 | 100 | 70 | 70 |
| Composition ratio of fine cellulose (wet pulverization) | 45 | 60 | | | | |
| Composition ratio of fine cellulose of 0.35 mm or less | 48 | 72 | 45 | 60 | 45 ↑ | 45 ↑ |
| Composition ratio of fusion-bondable fiber | | | — | — | 30 | 30 |
| Composition ratio of aqueous binder | — | — | — | — | — | — |

| Item | Embodiment 7 | Embodiment 8 | Comparative Example 1 | Comparative Example 2 | Comparative Example 3 |
|---|---|---|---|---|---|
| Absorbent (g) | 85 | 85 | 85 | 75 | 85 |
| Test gas | DME/LPG | DME/LPG | DME/LPG | DME/LPG | DME/LPG |
| Time until liquid leakage (sec) | about 20 sec | about 20 sec | about 2 sec | about 5 sec | about 10 sec |
| Evaluation | ○ | ○ | X | X | X |
| Coloring | NO | Visible | NO | Visible | Visible |
| Raw material | LBKP | Waste newspaper | LBKP | Waste newspaper | Waste newspaper |

TABLE 1-continued

| Configuration | Coreless columnar roll from sheet | Columnar block charged in nonwoven fabric | Columnar block charged in nonwoven fabric | Columnar shape by folding mat into two and stapling | Columnar shape by folding mat into two and stapling |
|---|---|---|---|---|---|
| Covering material | NO | Nonwoven fabric | Nonwoven fabric | Nonwoven fabric | Nonwoven fabric |
| Classification | Carried out | Carried out | Carried out | — | — |
| Composition ratio of dry defibrated cellulose | 82.5 | 100 | 100 | 100 | 100 |
| Composition ratio of fine cellulose (wet pulverization) | | | | | |
| Composition ratio of fine cellulose of 0.35 mm or less | 45 ↑ | 50 | 20 | 40 | 40 |
| Composition ratio of fusion-bondable fiber | — | — | — | — | — |
| Composition ratio of aqueous binder | 17.5 | — | — | — | — |

BRIEF EXPLANATION OF THE DRAWINGS

FIG. 1 shows one example of the arrangement of a dust blower to which the present invention is applied, and (a), (b) and (c) are respectively a side view of the dust blower, a longitudinal sectional view thereof in an upright position, and a longitudinal sectional view thereof in an inverted position.

The invention claimed is:

1. A spray can product, which comprises a spray can having contained under pressure therein:
   an absorbent composed of 70 through 95 mass % of an assembly of pulverized cellulose fibers including defibrated cellulose fibers obtained with a dry type defibrating device and at least 45 mass % of fine cellulose fibers having a fiber length of 0.35 mm or less, and 5 through 30 mass % of a fusion-bondable resin, and
   an inflammable liquefied gas selected from the group consisting of liquefied dimethyl ether and a liquefied petroleum gas and in a liquefied state at the pressure within the spray can, the absorbent absorbing and retaining therein the inflammable liquefied gas,
   wherein the absorbent is a sheet covered coreless column of the assembly of pulverized cellulose fibers having a size less than that of a main part of the spray can, the absorbent being formed by shaping the assembly of pulverized cellulose fibers into a coreless columnar configuration and covering a surface of the coreless columnar configuration with a surface sheet,
   the absorbent is closely charged in the spray can with a space remaining between a side of a head part of the spray can and the absorbent, and
   the inflammable liquefied gas is absorbed and retained within gaps provided between the fine cellulose fibers without existing in the space on the side of the head part of the spray can.

2. The spray can product according to claim 1, wherein the absorbent is made by steps including:
   drawing out a surface sheet on a mesh conveyer;
   defibrating cellulose fibers with a dry web forming device to obtain the cellulose fibers including at least 45 mass % of fine cellulose fibers having a fiber length of 0.35 mm or less;
   blending 70 through 95 mass % of the obtained cellulose fibers and 5 through 30 mass % of a fusion-bondable resin;
   further mixing the blended material in air;
   continuously accumulating the mixture on the surface sheet to form a web;
   drawing out another surface sheet on the web as a lamination layer; and
   heating the web in a heating furnace, thereby bonding the web to the surface sheets.

3. The spray can product as claimed in claim 1, wherein the absorbent is obtained by accumulating the pulverized cellulose fibers on the surface sheet, and forming a resultant absorbent sheet into a coreless roll-shaped columnar configuration.

4. A spray can product, which comprises a spray can having contained under pressure therein:
   an absorbent composed of 70 mass % or more of an assembly of pulverized cellulose fibers including defibrated cellulose fibers obtained with a dry type defibrating device, and at least 45 mass % of fine cellulose fibers having a fiber length of 0.35 mm or less, and
   an inflammable liquefied gas selected from the group consisting of liquefied dimethyl ether and a liquefied petroleum gas and in a liquefied state at the pressure within the spray can, the absorbent absorbing and retaining therein the inflammable liquefied gas,
   wherein the absorbent is a sheet covered coreless column of the assembly of pulverized cellulose fibers, the absorbent is formed by shaping the assembly of pulverized cellulose fibers into a coreless columnar configuration and covering a surface of the coreless columnar configuration with a surface sheet, and the absorbent has a size less than that of a main part of the spray can,
   the absorbent is closely charged in the spray can with a space remaining between a side of a head part of the spray can and the absorbent, and
   the inflammable liquefied as is absorbed and retained within gaps provided between the fine cellulose fibers without existing in the space on the side of a head part of the spray can.

5. The spray can product according to claim 4, wherein the absorbent is made by steps including:
   defibrating cellulose fibers with a dry web forming device to obtain the cellulose fibers including 45 through 100 mass % of fine cellulose fibers having a fiber length of 0.35 mm or less;
   dropping and accumulating the defibrated cellulose fibers on a mesh-shaped conveyer that is running;
   spraying an aqueous binder liquid on the accumulated cellulose fibers; and
   heating the accumulated cellulose fibers, thereby bonding the accumulated cellulose fibers to each other.

6. The spray can product as claimed in claim 4, wherein the absorbent is obtained by charging the pulverized cellulose fibers in a bag as the surface sheet and forming a resultant charged bag into a columnar configuration, and is closely charged in the spray can.

7. The spray can product as claimed in claim 4, wherein the absorbent is obtained by accumulating the pulverized cellulose fibers on a surface sheet, and forming a resultant absorbent sheet into a coreless roll-shaped columnar configuration, and is closely charged in the spray can.

\* \* \* \* \*